United States Patent
Hayakawa et al.

(10) Patent No.: US 7,832,284 B2
(45) Date of Patent: *Nov. 16, 2010

(54) LOAD SENSOR AND MANUFACTURING METHOD FOR THE SAME

(75) Inventors: Hideyuki Hayakawa, Nishio (JP); Kenji Morikawa, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/383,426

(22) Filed: Mar. 24, 2009

(65) Prior Publication Data

US 2009/0241690 A1    Oct. 1, 2009

(30) Foreign Application Priority Data

Mar. 25, 2008    (JP) ............................. 2008-078646

(51) Int. Cl.
    *G01D 7/00*    (2006.01)
(52) U.S. Cl. ................................. 73/862.046
(58) Field of Classification Search ............ 73/862.046, 73/777
    See application file for complete search history.

(56) References Cited

U.S. PATENT DOCUMENTS

| | | | |
|---|---|---|---|
| 4,993,266 | A | 2/1991 | Omura et al. |
| 2005/0103124 | A1 | 5/2005 | Asai et al. |
| 2005/0173904 | A1 | 8/2005 | Morikawa |
| 2005/0193828 | A1 | 9/2005 | Morikawa |
| 2009/0235760 | A1* | 9/2009 | Hayakawa et al. ..... 73/862.046 |

FOREIGN PATENT DOCUMENTS

| | | |
|---|---|---|
| JP | 8-85436 | 4/1996 |
| JP | 08-145818 | 6/1996 |
| JP | 11-037860 | 2/1999 |
| JP | 2004-270844 | 9/2004 |
| JP | 2005-172793 | 6/2005 |
| JP | 2005-249598 | 9/2005 |

OTHER PUBLICATIONS

Office action dated Mar. 2, 2010 in corresponding Japanese Application No. 2008-078646.
Office action dated Jul. 29, 2010 in corresponding Japanese Application No. 2008-078646.

* cited by examiner

*Primary Examiner*—Jewel Thompson
(74) *Attorney, Agent, or Firm*—Harness, Dickey & Pierce, PLC

(57) ABSTRACT

A detection element detects at least compression load. A first member has a surface provided with the detection element. A preload adjusting member has a tip end configured to apply pressure to the detection element. The first member and the second member are connected with each other and configured to transmit load to the detection element. The second member has a fitted portion, which has an inner circumferential periphery defining a thread groove, which is screwed with the preload adjusting member. The second member causes elastic deformation in response to adjustment of screwing of the preload adjusting member and causes change in preload applied to the detection element. A buffer member is interposed between the preload adjusting member and the detection element.

10 Claims, 3 Drawing Sheets

LOAD SENSOR AND MANUFACTURING METHOD FOR THE SAME

CROSS REFERENCE TO RELATED APPLICATIONS

This application is based on and incorporates herein by reference Japanese Patent Applications No. 2008-78646 filed on Mar. 25, 2008.

FIELD OF THE INVENTION

The present invention relates to a load sensor. The present invention further relates to a method for manufacturing the load sensor.

BACKGROUND OF THE INVENTION

For example, US2005/0103124A1 (JP-A-2005-172793) discloses a compression-type load detection element, which includes a pressure-sensitive element and electrical insulators. The pressure-sensitive element has an electrical property, which changes in response to stress applied thereto. The pressure-sensitive element has two opposed surfaces on which the electrical insulators are integrally provided. The pressure-sensitive element of the load detection element includes a matrix, which is formed from glass, and conductive particles, which have conductivity. The conductive particles are distributed in the matrix. The conductive particles are formed from $RuO_2$, for example. The thickness of the pressure-sensitive element is 1 to 200 micrometers, for example. The pressure-sensitive element is provided with a pair of electrodes. As disclosed in US2005/0193828A1 (JP-A-2005-249598) and JP-A-11-37860, the load detection element is capable of detecting compression load in addition to tensile load by applying preload to the load detection element in advance. US2005/0193828 A1 and JP-A-11-37860 may teach an effect produced by applying the preload to the load detection element, nevertheless fails to teach a method for applying the preload in detail.

The preload within a preferable range needs to be applied, and therefore the preload needs to be adjusted one by one in consideration of dimensional variation of components of the load detection element. In general, torsion strength of the load detection element is less than compression strength thereof, and therefore the load detection element is less durable against application of torque compared with application of compression load. Therefore, in the structure of US 2005/0193828A1 and JP-A-11-37860, in each of which the screw is used to adjust the preload, the load detection element may be applied with torque in response to application of the preload. In general, the rigidity in the torsion direction of the load detection element is insufficient relative to rigidity in the compression direction. Since load detection element may be broken when being applied with excessive torque, the preload caused by applying torque to the load detection element may be limited so as not to cause failure in the load detection element.

An example of a load sensor will be described with reference to FIG. 5. A load sensor 91 includes a load detection element 910, a first structural member 920, a second structural member 930, a preload adjusting member 935, a signal processing circuit 950, and the like. The preload applied to the load detection element 910 is adjusted by screwing the preload adjusting member 935 into the second structural member 930. In order to increase the preload, the preload adjusting member 935 needs to be further screwed. However, stress applied from the preload adjusting member 935 to the load detection element 910 increases in response to increase in screwing depth and application of preload. Consequently, friction between the preload adjusting member 935 and the load detection element 910 increases, and therefore the torque is apt to be further transmitted to the load detection element 910. As the preload adjusting member 935 is further screwed, the torque is further directly transmitted to the load detection element 910. Thus, the load detection element 910 may be applied with twist when being applied with the preload. When large preload is applied to the load detection element 910, excessive torque may be applied to the load detection element 910. Therefore, maximum preload is limited in consideration of the torque applied to the load detection element 910.

SUMMARY OF THE INVENTION

In view of the foregoing and other problems, it is an object of the present invention to produce a load sensor in which a range of preload and a detection range of load can be also enhanced. It is another object of the present invention to produce a method for producing the load sensor.

According to one aspect of the present invention, a load sensor comprises a detection element configured to detect at least compression load. The load sensor further comprises a structural member including a first member, a second member, and a preload adjusting member. The first member has a surface provided with the detection element. The first member and the second member are connected with each other and configured to transmit load to the detection element. The preload adjusting member has a tip end configured to apply compression load to the detection element. The second member has a screwed portion, which has an inner periphery defining a thread groove and configured to be screwed with the preload adjusting member. The second member is configured to elastically deform to cause change in preload applied to the detection element in response to adjustment of screwing of the preload adjusting member. The load sensor further comprises a buffer member interposed between the preload adjusting member and the detection element.

According to another aspect of the present invention, a method for manufacturing the load sensor, the method comprises locating the detection element between the first member and the buffer member. The method further comprises screwing the preload adjusting member into the screwed portion so as to apply preload to the detection element via the buffer member, which is fixed to the second member, such that a load detection signal outputted from the detection element becomes predetermined value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Construction

Figure 1:
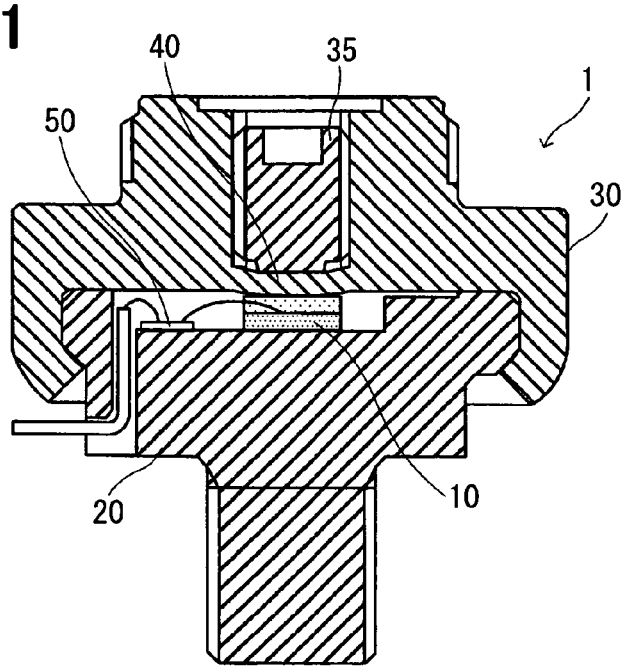
FIG. 1 is a sectional view showing a load sensor according to an embodiment.
Figure 2:
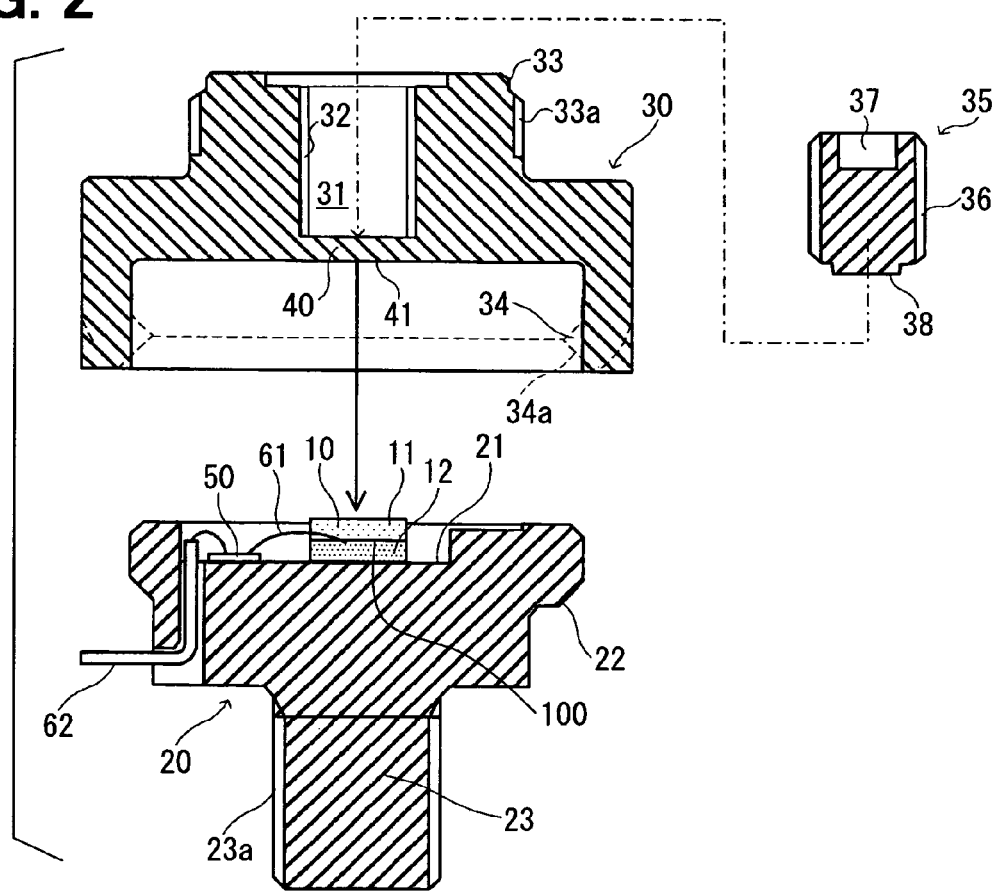
FIG. 2 is an exploded sectional view showing the load sensor according to the embodiment.

As follows, a construction and a structure of a load sensor according to the present embodiment will be described. As shown in FIGS. 1, 2, according to the present embodiment, a load sensor 1 includes a load detection element 10, a structural member (body), a preload adjusting member 35, a signal processing circuit 50, and the like. The structural member includes a first structural member 20 and a second structural member 30.

The load detection element 10 is configured to detect at least compression force. The load detection element 10 includes element members 11, 12 and a pressure-sensitive element 100. Each of the element members 11, 12 is formed from insulative materials. The pressure-sensitive element 100 is substantially in a film shape and interposed between the element members 11, 12. The insulative materials of the element members 11, 12 are preferably ceramic materials such as alumina (Al2O3) having high rigidity. The element members 11, 12 may be formed from at least one of zirconia (ZrO2), MgAl2O4, SiO2, 3Al2O3.2SiO2, Y2O3, CeO2, La2O3, Si3N4, and the like. Alternatively, the element members 11, 12 may be formed from a metallic material or the like and covered with at least one of the above insulative materials of zirconia (ZrO2), MgAl2O4, SiO2, 3Al2O3.2SiO2, Y2O3, CeO2, La2O3, Si3N4, and the like to be electrically insulative.

It suffices that the pressure-sensitive element is formed from a material, which changes in electrical property according to a load applied from the outside. For example, the pressure-sensitive element may be formed from a composite material formed from glass as a matrix and electrically conductive particles, which are distributed in the matrix. The matrix of the pressure-sensitive element may be formed from borosilicate glass, for example. The conductive particles of the pressure-sensitive element may be formed from ruthenium oxide (RuO2), lead ruthenate, or the like. The conductive particles may be preferably formed from ruthenium oxide.

The pressure-sensitive element of the load detection element 10 may be formed by doctor blade, extrusion, printing such as screen printing, transfer, or the like. Specifically, the pressure-sensitive element may be formed by, for example, distributing RuO2 particles in glass as a matrix so as to produce a composite material, arbitrarily adding a foaming agent or a reinforcing material to the composite material, and applying a suitable organic binder and solvent such that the composite material becomes in a form of paste. The composite material in a form of paste is molded and sintered to be a product of the pressure-sensitive element. The organic binder may be cellulose resin, acrylic resin, or the like. The solvent may be terpineol, butyl carbitol acetate, or the like.

The organic binder and the solvent are configured to form pores in the composite material of the pressure-sensitive element when the composite material is heated and increased in temperature to be dried and degreased. That is, the organic binder and the solvent are configured to act as pore formation agents. The foaming agent may be an organic foaming agent such as azodicarvone amide (ADCA) and an inorganic foaming agent, for example.

The pressure-sensitive element can be reduced in apparent Young's modulus by forming pores therein, and thereby strain caused in the pressure-sensitive element by being applied with stress can be increased. Thus, sensitivity of the load detection element 10 can be further enhanced. As described above, the pores can be spontaneously formed when the composite material is applied with heat-treatment and calcinated to produce the pressure-sensitive element. A foaming agent of an organic substance or an inorganic substance may be added to the composite material of the pressure-sensitive element so as to foam the composite material to form the pores therein when the composite material is sintered.

When the pressure-sensitive element is produced by sintering, a glass material contained in the composite material of the pressure-sensitive element is melt to form the matrix when being heated and increased in temperature. In the melting glass, each of the pores easily becomes substantially in a spherical shape. Each of the pores is preferably in a spherical shape. As each of the pores becomes to be a spherical shape, stress concentration partially caused in the pressure-sensitive element can be reduced, and consequently breakage of the load detection element 10 can be avoided. The insulative material may be formed by doctor blade, extrusion, or the like. The pressure-sensitive element and the insulative material may be formed by the same manufacturing process or may be formed by different manufacturing processes.

The pressure-sensitive element and the insulative material are integrally formed preferably by being sintered. The pressure-sensitive element and the insulative material may be adhered to each other using adhesive such as low-melting glass. The load detection element 10 may be formed from zirconia and $La_{1-x}Sr_xMnO_3$ ($0 \leq x \leq 1$), which has a pressure resistance effect, as main materials. Specifically, the load detection element 10 may be formed from particles of zirconia as a matrix and $La_{1-x}Sr_xMnO_3$ ($0 \leq x \leq 1$), which has a pressure resistance effect and distributed in the matrix. In the present structure, the load detection element 10 changes in ohmic resistance (electric resistance) according to application of load, and thereby the load can be detected according to the change in ohmic resistance. Zirconia has high heat resistance, thereby being hard to change in temperature inside the sensor formed from zirconia. Therefore, detection error caused by change in temperature inside the sensor can be reduced in the present structure. Zirconia is high in toughness, and thereby the sensor being formed from zirconia has high durability against load and pressure. Thus, the mechanical strength of the load detection element 10 is increased when being formed from zirconia, and thereby rigidity of the load sensor 1 can be also enhanced.

The first structural member 20 has one side having a recess 21 substantially at a center portion. The recess 21 is fixed with the load detection element 10. The first structural member 20 has an outer circumferential periphery defining a flange portion 22. The recess 21 accommodates a wiring 61, a signal wire 62, and the like, in addition to the load detection element 10. The wiring 61 electrically connects the signal processing circuit 50 with the load detection element 10. The signal wire 62 communicates a signal processed by the signal processing circuit 50 to an external device. The first structural member 20 is higher in rigidity than both the load detection element 10 and the second structural member 30. The first structural member 20 is formed from carbon steel, for example. The first structural member 20 has the other side, which is the opposite side from the one side, to which the load detection element 10 is fixed. The other side of the first structural member 20 is provided with a fixing member 23 via which the first structural member 20 is fixed to a part of a detected object (not shown), load applied to which is measured. The fixing member 23 is substantially in a column-shape and extends from the one side, to which the load detection element 10 is provided, toward the opposite side. The outer circumferential periphery of the fixing member 23 defines thread grooves 23a via which the fixing member 23 can be screwed to the detected object.

The second structural member 30 includes a body portion 33, an annular portion, and a joint portion 34. The body portion 33 is substantially in a column shape and extends in the vertical direction in FIG. 1. The annular portion is located at the lower side of the body portion 33 in FIG. 1. The annular portion is substantially in a flange shape and radially extends from the lower side of the body portion 33. The joint portion 34 extends downward from the outer circumferential periphery of the annular portion. The joint portion 34 is crimped with the flange portion 22 of the first structural member 20 and engaged with the flange portion 22. The joint portion 34 may be welded to the flange portion 22 of the first structural member 20. The second structural member 30 elastically deforms and thereby applies preload to the load detection element 10. The second structural member 30 and the first structural member 20 transmit load, which is applied from the outside, to the load detection element 10 and thereby the load is detected by the load detection element 10.

According to the present shapes of the first structural member 20 and the second structural member 30, rigidity of the first structural member 20 and the second structural member 30 in a compression direction, in which the load detection element 10 is compressed, is smaller than the rigidity thereof in other directions. The body portion 33 has an adjusting member fitted portion (screwed portion) 31, which is in a bottomed tubular shape having a hole, which extends from a center portion of the upper surface thereof in FIG. 2 substantially in the axial direction. The adjusting member fitted portion 31 has the inner circumferential periphery, which defines thread grooves 32. The adjusting member fitted portion 31 has a buffer member 40, which is integrally formed with the body portion 33. The buffer member 40 defines the bottom surface of the body portion 33. The outer circumferential periphery of the body portion 33 defines a thread groove 33a. The thread groove 33a is configured to be screwed into the detected object (not shown).

The buffer member 40 is in contact with the load detection element 10 at a surface (buffer member) 41. The surface 41 is located at the opposite side of the bottom surface of the adjusting member fitted portion 31. The buffer member 40 is integrated with the second structural member 30. The buffer member 40 cannot rotate separately from the second structural member 30. The preload adjusting member 35 is substantially in a cylindrical shape and has the outer circumferential periphery defining thread grooves 36. The thread grooves 36 can be engaged with the thread grooves 32, which are provided on the inner circumferential periphery of the adjusting member fitted portion 31. The preload adjusting member 35 can be screwed into the adjusting member fitted portion 31. The preload adjusting member 35 is screwed into the adjusting member fitted portion 31, and finally presses the buffer member 40 at a tip end 38. The rear end of the preload adjusting member 35 has a tool engaging recess 37, to which a tool (not shown) is engaged so as to rotate the preload adjusting member 35. The tool is integrally rotatable with the preload adjusting member 35 around the axis when engaged with the preload adjusting member 35. The tool is engaged with the tool engaging recess 37, and the preload adjusting member 35 is rotated using the tool. Thereby, the preload adjusting member 35 is screwed into the adjusting member fitted portion 31, and the buffer member 40 can be pressed and deformed.

(Operation Effect)

According to the present embodiment, the load sensor having the above structure produces the following operation effects. The load detection element 10, the signal processing circuit 50, and the like are fixed inside the recess 21 of the first structural member 20. Subsequently, the joint portion 34 of the second structural member 30 is fitted to the flange portion 22 of the first structural member 20. Subsequently, the joint portion 34 is deformed to be a crimped portion 34a and engaged with the flange portion 22. Thus, the first structural member 20 is integrated with the second structural member 30. In the present condition, the surface 41 of the buffer member 40 at the opposite side of the second structural member 30 is not in contact with the load detection element 10, and the surface 41 and the load detection element 10 therebetween define a gap. The gap is reduced by screwing the preload adjusting member 35. According to the present structure, a dimensional error of the components can be absorbed. Alternatively, the surface 41 of the buffer member 40 at the opposite side of the second structural member 30 may be in contact with the load detection element 10 in a condition where the first structural member 20 is integrated with the second structural member 30. In this case, a certain amount of preload can be applied immediately after the integration of the first structural member 20 with the second structural member 30. Thereafter, the preload adjusting member 35 is screwed into the adjusting member fitted portion 31. In the present press-fitting process, the following processes are carried out with monitoring of the load, which is detected by using the load detection element 10 and outputted by the detected signal processing circuit 50. Whereby, the preload applied to the load detection element 10 can be accurately controlled as desired by detecting the load detected by using the load detection element 10.

The preload applied to the load detection element 10 does not change before the tip end 38 of the preload adjusting member 35 makes contact with the bottom surface of the buffer member 40 of the adjusting member fitted portion 31. Initially, the tip end 38 of the preload adjusting member 35 is not in contact with the buffer member 40, and thereby torque caused by rotation of the preload adjusting member 35 is not applied to the buffer member 40. The preload adjusting member 35 is further screwed after the preload adjusting member 35 makes contact with the bottom surface of the buffer member 40. Thus, the buffer member 40 deforms by being urged from the preload adjusting member 35. The present deformation caused in the buffer member 40 exerts an influence to the load detection element 10. Specifically, as the preload adjusting member 35 is further screwed, the surface 41 of the buffer member 40 at the opposite side makes contact with the load detection element 10. As the surface 41 of the buffer member 40 further urges the load detection element 10, the preload applied to the load detection element 10 becomes large. When the preload currently applied to the load detection element 10 is still smaller than a target preload, the preload adjusting member 35 is further screwed and thereby the currently applied preload can be increased. The tip end 38 of the preload adjusting member 35 is in contact with the buffer member 40, so that the torque caused by rotation of the preload adjusting member 35 may be transmitted to the buffer member 40. Even in the present condition, transmission of the torque to the load detection element 10 is restricted to a small degree, since the second structural member 30 is integrated with the buffer member 40, and the property of the buffer member 40 such as the material and the thickness is determined such that deformation caused in the buffer member 40 does not substantially exert a bad influence to the load detection element 10.

As the preload adjusting member 35 is further screwed, the strain caused in the second structural member 30 and/or the load detection element 10 toward the buffer member 40 eventually exceeds an elastic limit, and thus the second structural member 30 and/or the load detection element 10 cause plastic deformation. At the present condition, the applied preload does not further increase. At a yield point, the applied preload does not increase regardless of further screwing of the preload adjusting member 35. From the yield point, the preload adjusting member 35 is further screwed to cause plastic deformation in the second structural member 30 and/or the buffer member 40. Thereafter, the preload adjusting member 35 is rotated in a counter direction, which is opposite to a screwing direction in which the preload adjusting member 35 is previously screwed, and thereby the preload adjusting member 35 is slightly returned from the position corresponding to the yield point, so that the applied preload can be reduced. At the present condition, the plastic deformation caused in the second structural member 30 and/or the buffer member 40 remains.

In the present process, once the second structural member 30 and/or the buffer member 40 is deformed to the yield point, and thereafter the deformation is released. Thereby, the following operation effects (a) to (c) can be produced. (a) The preload applied to the load detection element 10 can be set smaller than an initial value of the preload applied when the first structural member 20 and the second structural member 30 are combined with each other. That is, elastic deformation decreases correspondingly to an amount of plastic deformation, and thereby the applied preload can be reduced. (b) The second structural member 30 and/or the buffer member 40, in particular, the buffer member 40, which makes contact with the load detection element 10, causes plastic deformation, and thereby the material thereof is hardened to enhance mechanical strength. (c) According to the present embodiment, once the preload beyond the maximum load in a load measurement is applied to the load sensor, and thereafter the preload is reduced below the yield point. Thereby, the second structural member 30 and/or the buffer member 40 may not cause plastic deformation in application of load to the maximum load. Thus, reliability of detection of the load sensor can be enhanced.

The first structural member 20 and the second member therebetween interpose the load detection element 10 in an interposing direction, and the first structural member 20 is urged onto the load detection element 10 in the interposing direction. In the embodiment, the rigidity of the second structural member 30, which transmits the load to the load detection element 10, in the interposing direction is smaller than the rigidity of the second structural member 30 in other directions than the interposing direction. In the present structure, influence to detection of the load sensor caused by load applied from the other direction can be reduced. Thus, the load applied in the interposed direction can be selectively and accurately detected.

In the embodiment, the components are respectively formed from the above-described materials, and thereby variation in preload caused by thermal expansion can be reduced to a minimum such as zero at a center value. The coefficients of linear expansion of alumina, carbon steel (S35C, SCM435), and stainless steel (SUS304, SUS305) are respectively about $7.2 \times 10^{-6}/°$ C., $10.8-11.4 \times 10^{-6}/°$ C., and $17.3 \times 10^{-6}/°$ C. The summation of product of the thickness and the linear expansion coefficient of the connecting portion between the first structural member 20 and the second structural member 30 is preferably the same as the summation of product of the thickness and the linear expansion coefficient of the interposed portion mainly including the preload adjusting member 35, the buffer member 40, and the load detection element 10. That is, thermal expansion caused in the first structural member 20, the second structural member 30, the preload adjusting member 35, the buffer member 40, and the load detection element 10 located in the center of the load sensor 1 and thermal expansion caused in the connected portion between the first structural member 20 and the second structural member 30 are preferably the same. Thereby, thermal expansion caused in the connection member and the load detection element 10 can be negated, and thereby influence such as variation in load caused by thermal expansion can be reduced to a minimum.

(First Modification)

Figure 3A:
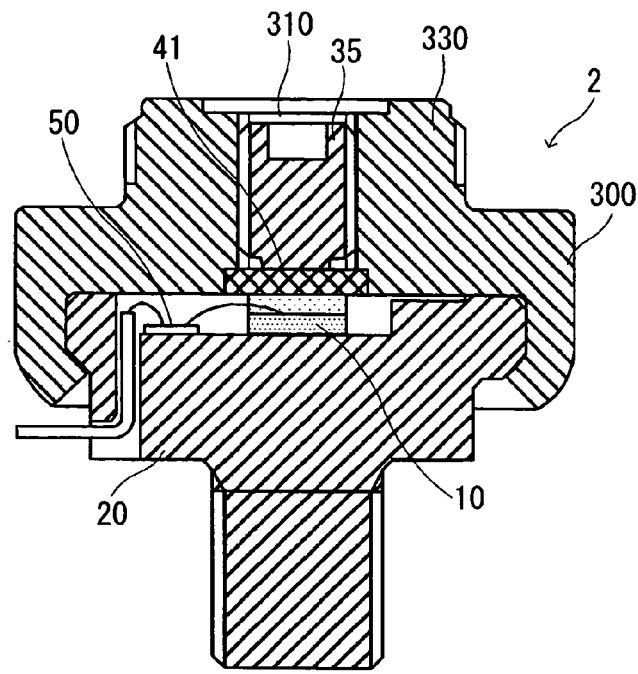
FIG. 3A is a sectional view showing a load sensor according to a first modification of the embodiment.
Figure 3B:
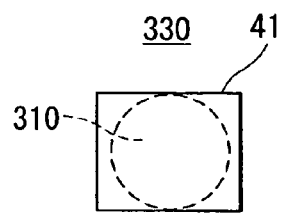
FIG. 3B is an enlarged view showing a body portion of a second structural member in the vicinity of a buffer member of the load sensor when being viewed from a lower side in FIG. 3A.

As shown in FIGS. 3A, 3B, instead of the second structural member 30 in the embodiment, a second structural member 300 may be employed. Instead of the adjusting member fitted portion 31 of the body portion 33 of the second structural member 30, a body portion 330 of the second structural member 300 has an adjusting member fitted portion 310. The adjusting member fitted portion 310 has a through hole and is different from the adjusting member fitted portion 31. Instead of the buffer member 40, a buffer member 41 is provided to the body portion 330 of the second structural member 300 at the location of the buffer member 40 in the above embodiment. The buffer member 41 is substantially in a thin-strip shape and has the thickness, which is substantially equivalent to the thickness of the buffer member 40. As shown in FIG. 3B, the second structural member 300 has a recess, to which the buffer member 41 can be fitted substantially without a gap therebetween. The recess of the second structural member 300 extends in the longitudinal and width directions of the buffer member 41, and fitted with the buffer member 41 in the direction in which the preload adjusting member 35 is rotated and inserted. According to the present structure, the buffer member 41 and the second structural member 300 cannot rotate relative to each other in the rotative direction of the preload adjusting member 35. Alternatively, the buffer member 41 may be in a disc-shape and may be press-fitted into a recess of the second structural member 300. According to the present first modification, the buffer member 41 is press-fitted, and thereby the buffer member 41 is capable of producing an operation effect even when the material of the buffer member 41 is changed.

In the load sensor 2 according to the present first modification, the preload adjusting member 35 is screwed so as to control the preload applied to the load detection element 10. In the present condition, the buffer member 41 is interposed between the preload adjusting member 35 and the load detection element 10 and fixed not to rotate relative to the second structural member 300. Therefore, similarly to the above embodiment, transmission of excessive torque to the load detection element 10 is substantially avoided, and large preload can be applied to the load detection element 10. According to the present first modification, in addition to the operation effect of the above embodiment, the material of the buffer member 41 may be different from the material of the second structural member 300. For example, the buffer member 41 may be formed from stainless steel, and the second structural member 300 may be formed from carbon steel.

(Second Modification)

Figure 4A:
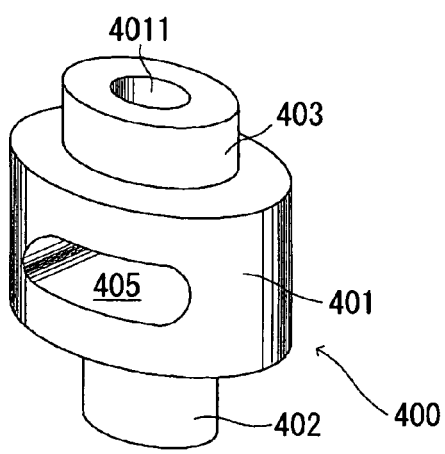
FIG. 4A is a perspective view showing a load sensor.
Figure 4B:
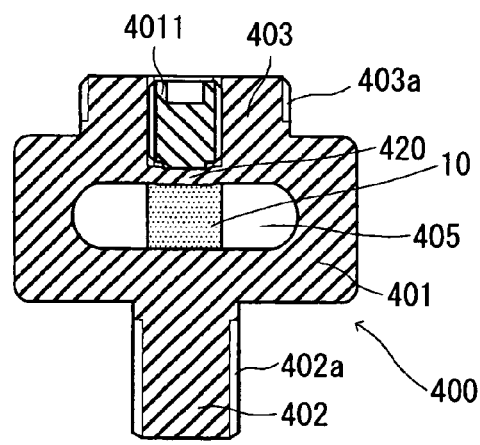
FIG. 4B is a sectional view showing the load sensor, according to a second modification of the embodiment.
Figure 5:
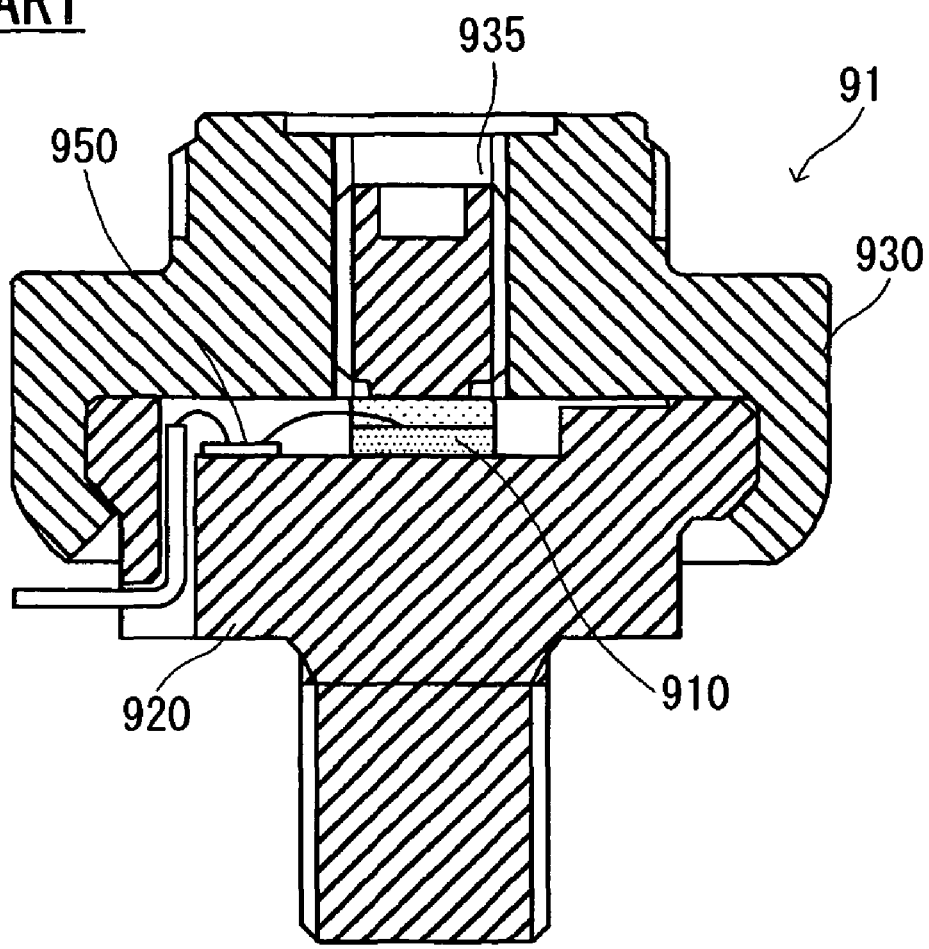
FIG. 5 is a sectional view showing a load sensor according to a prior art.

The first structural member 20 and the second structural member 30 need not be separate members and may be integrally formed. Specifically, according to the present second modification shown in FIGS. 4A, 4B, a load sensor 400 has a body portion 401 therein defining an opening 405 in which the load detection element 10 is provided. The opening 405 extends perpendicularly to the vertical direction in FIG. 4B in which the preload is applied to the load detection element 10. The opening 405 extends in the direction perpendicular to the sheet surface of FIG. 4B. The opening 405 may be an elongated hole. The opening 405 has the width in the lateral direction perpendicular to the vertical direction in which the preload is applied, and the width is larger than the height of the opening 405 in the vertical direction. According to the present modification, the rigidity of the body portion 401 in the vertical direction, in which the preload is applied to the body portion 401, is lower than the rigidity of the body portion 401 in other directions. According to the present structure, the opening 405 is elongated in the direction perpendicular to the compression direction, in which the preload is applied, and thereby the rigidity of the body portion 401 in the compression direction becomes lower than the rigidity in other directions than the compression direction. Thus, sensitivity of the load detection element 10 in the compression direction can be enhanced, compared with sensitivity in the other directions. The length of the opening 405 is determined in consideration of mechanical strength of the body portion 401, sensitivity of the load detection element 10, and the like. The load detection element 10 and the inside of the opening 405 may therebetween interpose a buffer member, similarly to the above embodiment and the first modification.

The body portion 401 is substantially in a columnar shape and integrally formed with mounting portions 402, 403. The mounting portions 402, 403 extend from the body portion 401 in the opposite axial directions. The mounting portions 402, 403 extend in the vertical direction (compression direction) in which a preload adjusting member 410 applies the preload to the load detection element 10. The outer circumferential peripheries of the mounting portions 402, 403 respectively define thread grooves 402a, 403a via which the load sensor 400 is mounted to a detected object (not shown). The mounting portion 403 and the body portion 401 have an adjusting member fitted portion 4011, which is a bottomed hole extending from the end surface of the mounting portion 403 at the opposite side of the body portion 401 toward the bottom surface at the side of the opening 405. The preload adjusting member 410 is screwed into the mounting portion 403, and thereby the load detection element 10 is urged and applied with the preload via a buffer member 420. The buffer member 420 is interposed between the preload adjusting member 410 and the load detection element 10. The buffer member 420 is integrally formed with the body portion 401, for example. The buffer member 420 may be fitted to the body portion 401 such that the buffer member 420 is not rotatable relative to the body portion 401. When the buffer member 420 is a separate component from the body portion 401, the buffer member 420 may be formed from a different material such as stainless steel from the materials of the body portion 401 and the load detection element 10.

(Third Modification)

One of the preload adjusting member 35 and the adjusting member fitted portion 31, 310 may not be provided with thread grooves before being assembled to each other. For example, in the structure shown in FIG. 4B, thread grooves may be provided only on the inner circumferential periphery of the adjusting member fitted portion 4011, and thread grooves may not be provided on the outer circumferential periphery of the preload adjusting member 410. Alternatively, thread grooves may be provided only on the outer circumferential periphery of the preload adjusting member 410, and thread grooves may not be provided on the inner circumferential periphery of the adjusting member fitted portion 4011.

In the above embodiment and modifications, thread grooves may be provided only on the inner circumferential periphery of the adjusting member fitted portion 31, 310, and thread grooves may not be provided on the outer circumferential periphery of the preload adjusting member 35. Alternatively, thread grooves may be provided only on the outer circumferential periphery of the preload adjusting member 35, and thread grooves may not be provided on the inner circumferential periphery of the adjusting member fitted portion 31, 310. Even in the present structures, when the preload adjusting member 35 is screwed into the adjusting member fitted portion 31, 310, thread grooves may be formed on the periphery on which the thread grooves are not initially provided. The thread grooves are formed on both the preload adjusting member 35, 410 and the adjusting member fitted portion 31, 310, 4011 in the load sensor, which is finally manufactured.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

The above structures of the embodiments can be combined as appropriate. Various modifications and alternations may be diversely made to the above embodiments without departing from the spirit of the present invention.

What is claimed is:

1. A load sensor comprising:
   a detection element configured to detect at least compression load; and
   a structural member including a first member, a second member, and a preload adjusting member,
   wherein the first member has a surface provided with the detection element,
   the first member and the second member are connected with each other and configured to transmit load to the detection element,
   the preload adjusting member has a tip end configured to apply compression load to the detection element,
   the second member has a screwed portion, which has an inner periphery defining a thread groove and configured to be screwed with the preload adjusting member, and
   the second member is configured to elastically deform to cause change in preload applied to the detection element in response to adjustment of screwing of the preload adjusting member,
   the load sensor further comprising:
   a buffer member interposed between the preload adjusting member and the detection element.

2. The load sensor according to claim 1, wherein the buffer member is integrated with the second member.

3. The load sensor according to claim 1,
   wherein the first member and the second member therebetween interpose the detection element in an interposing direction, and
   rigidity of the structural member in the interposing direction is smaller than rigidity of the structural member in other directions.

4. The load sensor according to claim 1,
wherein the buffer member is in contact with a contact portion of the detection element,
the contact portion is formed from ceramic,
the buffer member is formed from stainless steel, and
the second member is formed from carbon steel.

5. The load sensor according to claim 1,
wherein the detection element has a matrix, which is formed from glass, and conductive particles, which are distributed in the matrix and formed from $RuO_2$ having electrical conductivity,
the detection element includes a pressure-sensitive element, which changes in electrical property in response to application of stress, and insulative members, which are electrically insulative, and
the insulative members are integrally formed respectively on opposed surfaces of the pressure-sensitive element.

6. The load sensor according to claim 1, wherein the buffer member is fixed to the second member.

7. The load sensor according to claim 1,
wherein the structural member therein defines an inner space, which has a first length in an axial direction of the structural member,
the inner space has a second length in a direction perpendicular to the axial direction, and
the first length is smaller than the second length.

8. The load sensor according to claim 1, wherein the first member, the second member, and the buffer member are integrally formed with each other.

9. A method for manufacturing the load sensor according to claim 1, the method comprising:
locating the detection element between the first member and the buffer member; and
screwing the preload adjusting member into the screwed portion so as to apply preload to the detection element via the buffer member, which is fixed to the second member, such that a load detection signal outputted from the detection element becomes predetermined value.

10. The method according to claim 9,
wherein the press-fitting further includes:
monitoring the load detection signal outputted from the detection element.

* * * * *